(12) United States Patent
Barber

(10) Patent No.: US 6,478,279 B1
(45) Date of Patent: Nov. 12, 2002

(54) ADAPTER BRACKET FOR A KEYBOARD PLATFORM SUPPORT MECHANISM

(75) Inventor: Peter M. Barber, Fergus (CA)

(73) Assignee: CompX International Inc., Mauldin, SC (US)

(*) Notice: Subject to any disclaimer, the term of this patent is extended or adjusted under 35 U.S.C. 154(b) by 33 days.

(21) Appl. No.: 09/739,073

(22) Filed: Dec. 15, 2000

Related U.S. Application Data

(60) Provisional application No. 60/211,106, filed on Jun. 12, 2000.

(51) Int. Cl.[7] ............................................... F16M 13/00
(52) U.S. Cl. ................ 248/424; 248/286.1; 248/281.11
(58) Field of Search ............................. 248/424, 298.1, 248/291.1, 292.11, 284.1, 918

(56) References Cited

U.S. PATENT DOCUMENTS

| | | | | | |
|---|---|---|---|---|---|
| 5,681,116 A | * | 10/1997 | Lin | ........................... | 384/42 |
| 5,924,664 A | * | 7/1999 | Mileos et al. | ........... | 248/281.11 |
| 6,116,557 A | * | 9/2000 | Choy et al. | ............... | 248/286.1 |
| 6,322,031 B1 | * | 11/2001 | LeClair et al. | ........... | 248/286.1 |
| 6,336,618 B1 | * | 1/2002 | Barber | ..................... | 248/284.1 |

* cited by examiner

Primary Examiner—Anita King
(74) Attorney, Agent, or Firm—Banner & Witcoff, Ltd.

(57) ABSTRACT

An adaptor bracket for attaching a keyboard arm having a plate to a base frame wherein the adaptor bracket includes a housing having a projecting hook at one end and a projecting flange at the other end and the hook is adapted to fit over a slide member of the base frame and further wherein the adaptor is connectable to the slide member by engaging the hook with the slide member and attaching the flange to the slide member with a fastener.

9 Claims, 7 Drawing Sheets

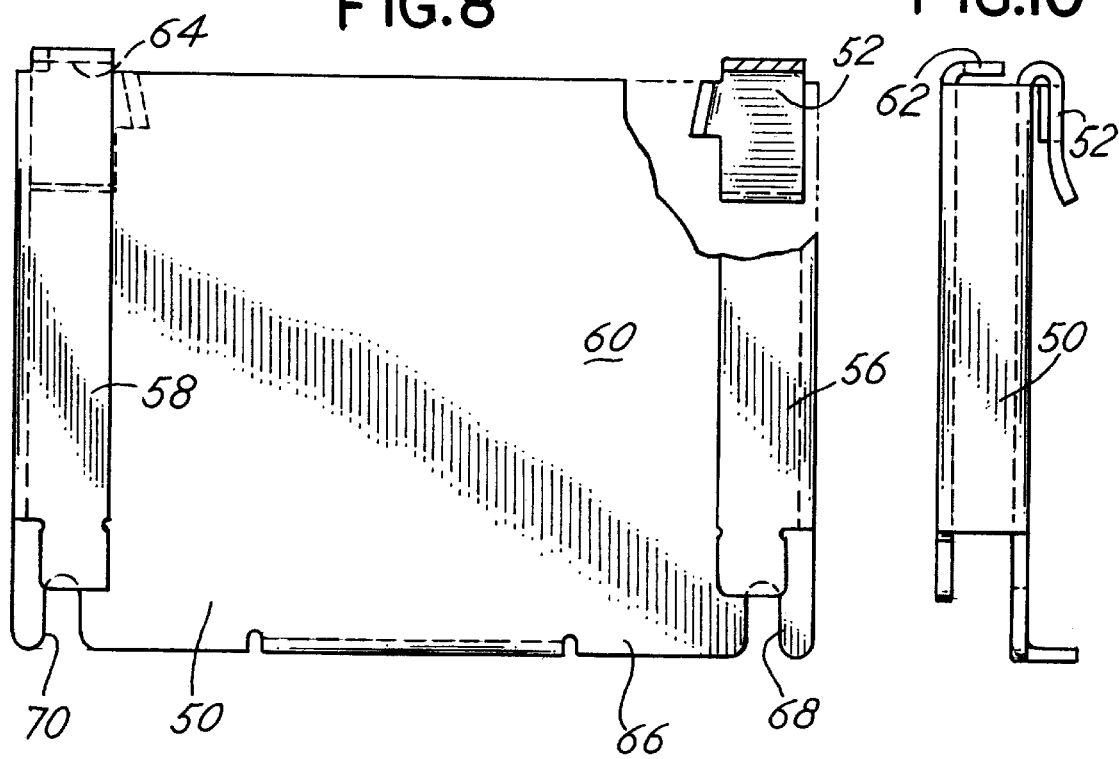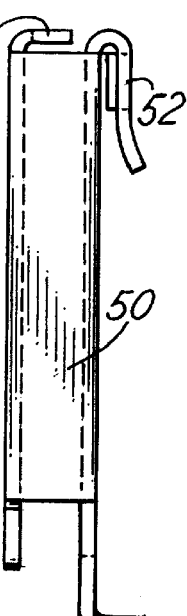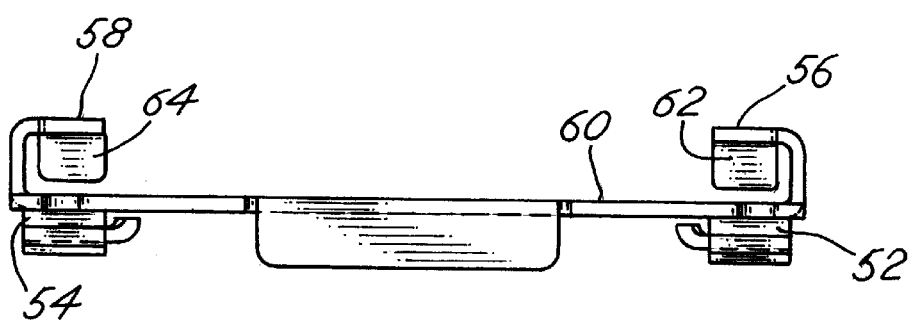

ADAPTER BRACKET FOR A KEYBOARD PLATFORM SUPPORT MECHANISM

CROSS REFERENCE TO RELATED APPLICATIONS

This application relates to provisional application Ser. No. 60/211,106 filed Jun. 12, 2000.

BACKGROUND OF THE INVENTION

This invention relates to a computer keyboard platform support mechanism and, more particularly, to the construction of a means for attaching a keyboard arm to a base frame. Specifically, a base frame is typically attached to the underside of a desk or support. A slide mechanism is incorporated into the base frame. A computer keyboard support arm is then suspended from the slide mechanism so that the support arm may be moved from a position beneath the desktop to a position extending outwardly from the desktop.

When a keyboard platform support mechanism is mounted to the underside of a desk, the separate base frame is first typically attached to the underside of the desk by means of screws. The separate keyboard arm is then attached to the slide mechanism or slide brackets incorporated in the base frame by bolting the keyboard arm to the slide mechanism associated with the base frame. Due to the weight and bulk of the keyboard arm, and further due to the fact that the attachment of the keyboard arm must be effected underneath the top of the desk, difficulty is often encountered when attempting to attach or bolt the keyboard arm to the slide mechanism of the base frame. The confined space and orientation of the fastening bolts makes attachment of the keyboard arm to the slide mechanism difficult, if not dangerous. For example, the individual installing such an assembly may even be required to lie flat on his or her back and simultaneously support the weight of the keyboard arm while trying to locate the fasteners and attach the fasteners through a plate in order to affix the keyboard arm to the slide mechanism of the base frame beneath the flat top surface of the desk. This has resulted in difficulties in the installation process for such keyboard arms and on some occasions, provided a potential situation of hazard. Thus, there has developed a need to provide an alternative and more desirable way in which to attach a keyboard arm to the slide mechanism of a base frame in an assembly comprising a base frame as well as the keyboard arm.

SUMMARY OF THE INVENTION

In a principal aspect, the present invention comprises a keyboard platform support mechanism which includes a base frame with a slide mechanism and a keyboard support arm configured for attachment to the slide mechanism of the base frame. The support arm is attached and held to the slide mechanism of the base frame by a special adapter which is designed to receive the swivel plate of the support arm. The adapter housing includes hooks which fit over the slide mechanism of the base frame to support the attached keyboard arm. Fasteners can then be easily guided through appropriate flanges and slots in the adapter to tightly attach the adapter and thus the support arm to the slide mechanism of the base frame.

Thus, it is an object of the invention to provide an improved mechanism and means for attachment of a keyboard support arm to the undercarriage or slide mechanism of a base frame that is attached to the underside of a desk.

It is a further object of the invention to provide an adapter mechanism which is designed to receive a support or swivel plate of a keyboard arm and retain that plate while effecting attachment of the keyboard support arm to the slide mechanism of a base frame.

Yet another object of the invention is to provide an adapter which permits attachment of a keyboard support arm of a keyboard support assembly to the base frame thereof in a manner which enhances the ease of such attachment and reduces the potential hazard associated with such attachment.

These and other objects, advantages and features of the invention will be set forth in the detailed description which follows.

BRIEF DESCRIPTION OF THE DRAWING

In the detailed description which follows, reference will be made to the drawing comprised of the following figures:

FIG. 8 is a plan view of the adapter which is utilized to attach the support arm to the slide mechanism of the base plate;

FIG. 9 is an end view of the adapter of FIG. 8;

FIG. 10 is a side view of the adapter of FIG. 8;

DESCRIPTION OF THE PREFERRED EMBODIMENT

Figure 1:
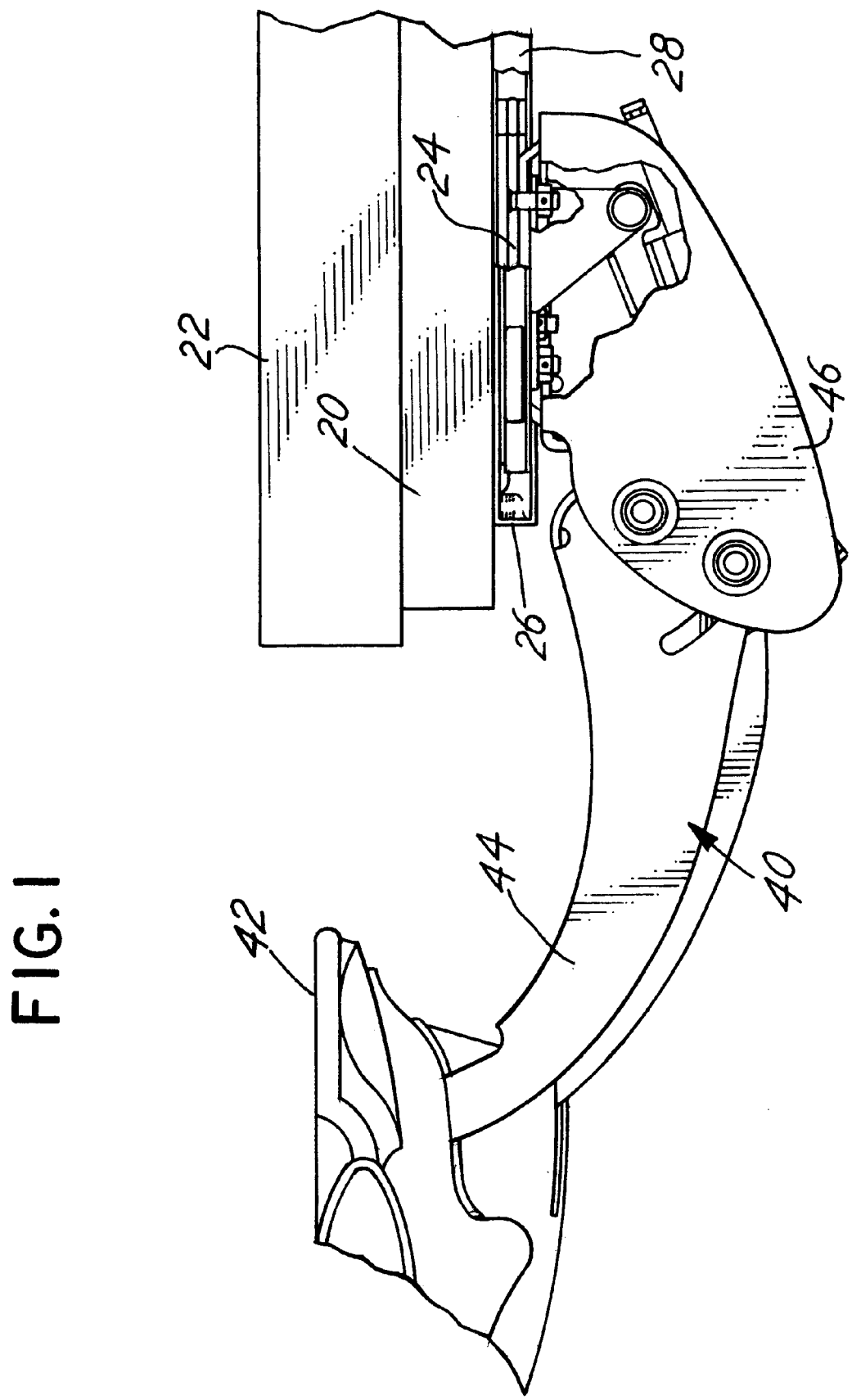
FIG. 1 is a side elevation of a keyboard support arm assembly which incorporates the adapter of the invention for attachment of the keyboard arm to the base frame.
Figure 2:
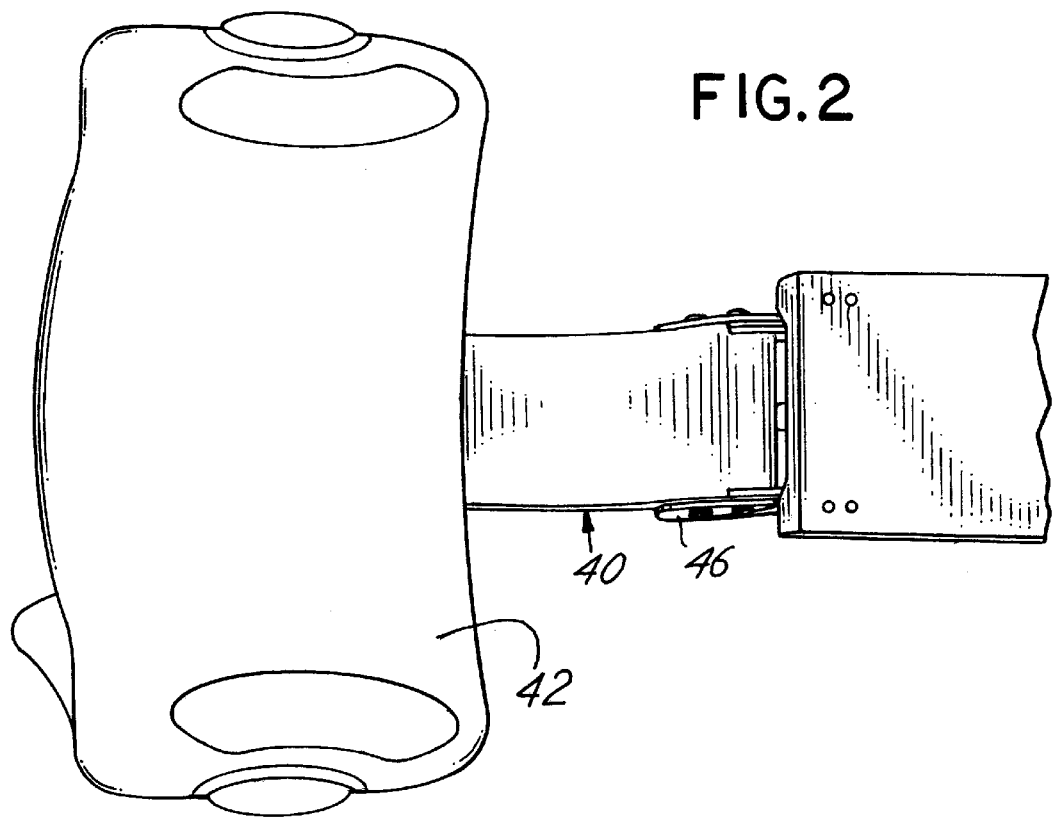
FIG. 2 is a top plan view of the assembly of FIG. 1.
Figure 3:
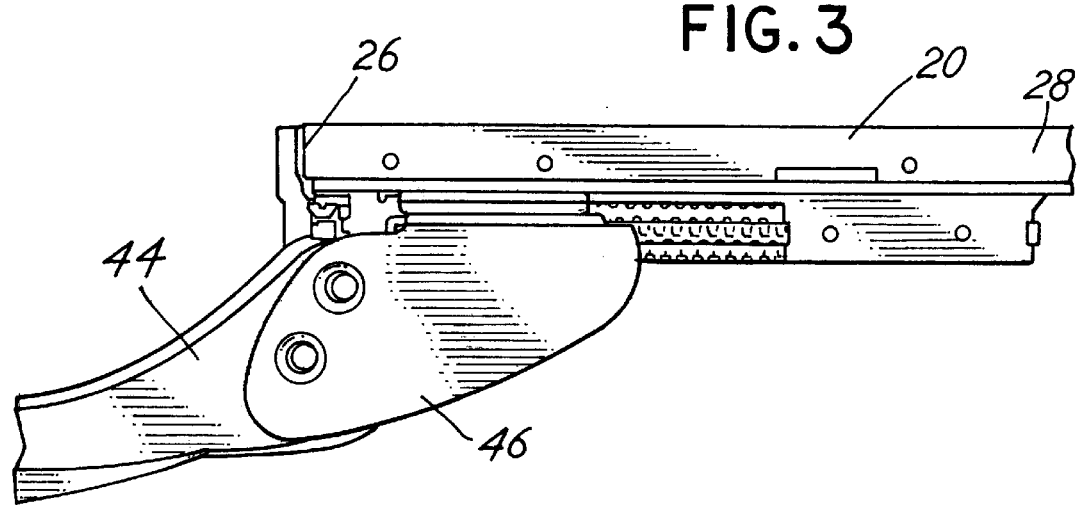
FIG. 3 is a partial side elevation of the assembly of FIG. 1.
Figure 4:
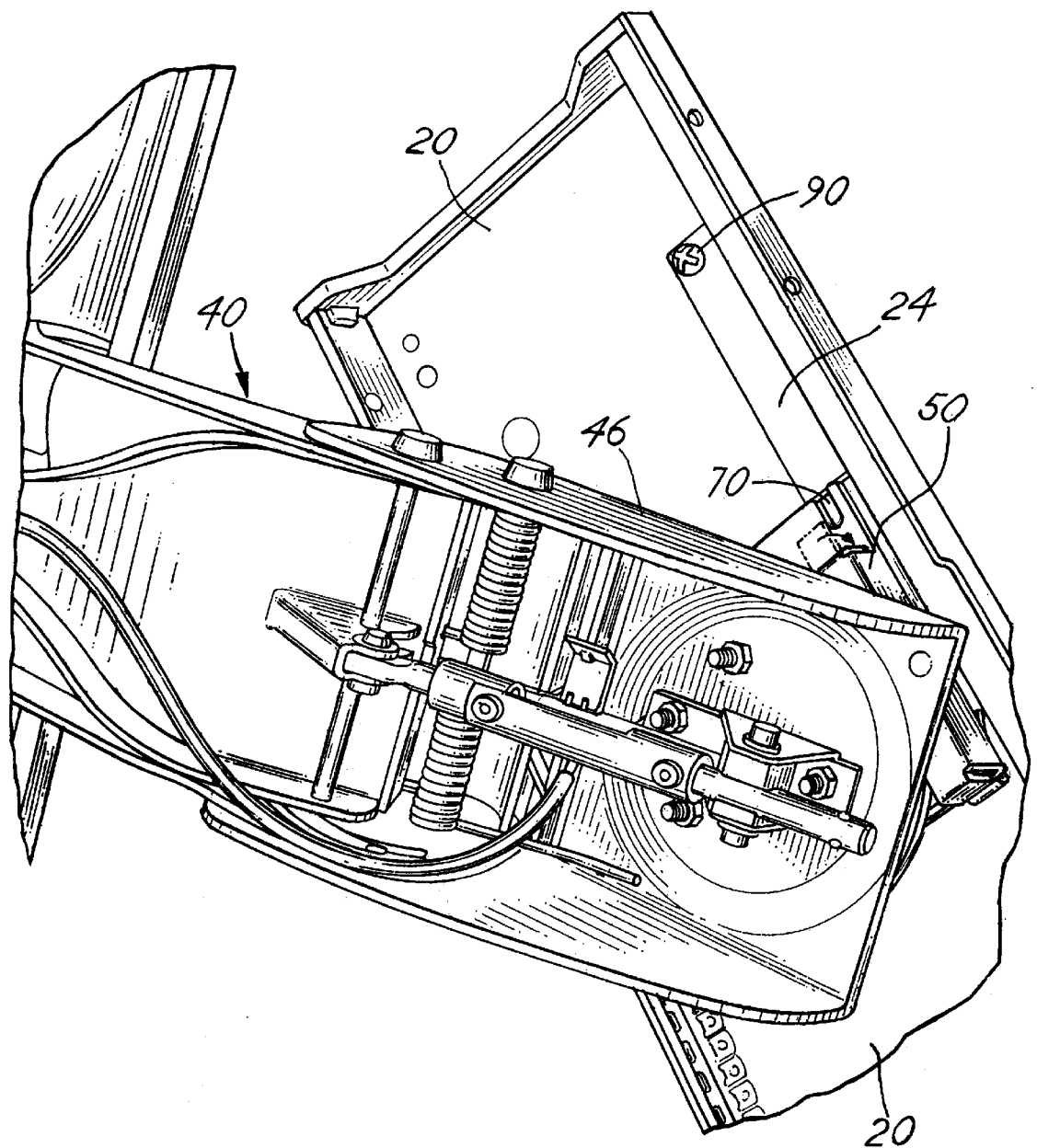
FIG. 4 is a view of the underside of the base frame of the assembly wherein the keyboard arm is positioned for attachment to the slide mechanism of the base frame.

Referring to FIGS. 1–3, there is depicted the general overall construction of a keyboard platform support mechanism or assembly. The assembly includes a base frame 20 which is attached to the underside of a table or desk 22 by means of fasteners which penetrate through the base frame 20 and extend into the table 22. The base frame 20 includes a slide mechanism. The slide mechanism typically includes a slide plate 24 mounted in a ball bearing raceway. Slide plate 24 in the embodiment depicted is arranged or positioned in a side channel of the base frame 20 such as depicted in FIG. 4. Referring to FIG. 4, it will be noted that slide bracket or slide plate 24 is positioned in a ball bearing raceway on one side of the base frame 20. A similar slide bracket or slide plate 24 is positioned on the opposite side of the base frame 20. Plates 24 permit sliding between the front end 26 of the frame 20 and the rear end 28. Thus slide brackets 24 are parallel and mounted in parallel spaced raceways on opposite sides of the base frame 20 permitting sliding movement of the brackets 24 between the front end 26 and rear end 28 of frame 20.

The keyboard platform support arm assembly further includes a keyboard support arm 40. The keyboard support arm 40 may be of any desired construction. The keyboard support arm 40 depicted in the drawings is a typical support arm including a support platform 42 connecting links or arms 44, a support or undercarriage bracket 46 and, most importantly, a keyboard arm swivel plate 84 as depicted in FIG. 6.

Figure 6:
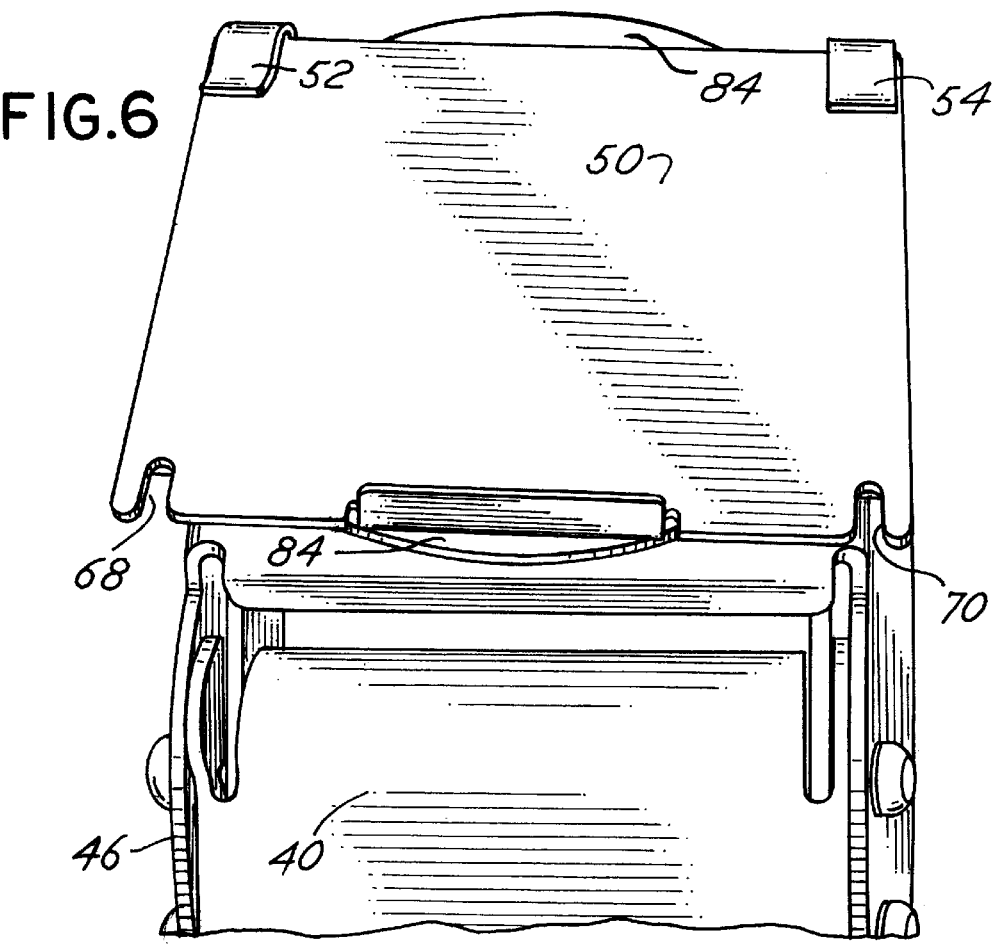
FIG. 6 is a view of the adapter which is attached to the support arm.

The subject matter of the invention relates to the mechanism and means by which the keyboard arm swivel plate 84 depicted in FIG. 6 may be attached to the sliding bracket members 24 thereby effecting attachment of the keyboard arm 40 to the base frame 20. This attachment is effected by means of an adapter or adapter bracket depicted in the figures and specifically including a housing 50 as depicted in FIGS. 8–10 which incorporates swivel glides 80 depicted in FIGS. 11–14. The swivel glides 80 depicted in FIGS. 11–14 engage or receive the keyboard arm swivel plate 84 depicted in FIG. 6 and slide into the housing 50 depicted in FIGS. 8–10. The housing 50 depicted in FIGS. 8–10 is then easily mounted or attached to the slide brackets 24 depicted in FIG. 4 due to the construction of the housing 50 and the construction of the slide mounting brackets 24. Thus the following description will focus initially on the construction of the housing 50 of the adapter depicted in FIGS. 8–10 to be followed by the construction of the glides depicted in FIGS. 11–14.

Housing 50 includes first and second formed hooks 52, 54 along one edge of the housing 50. The hooks 52, 54 are designed to fit over and engage the slide brackets 24 of the slide mechanism. The hooks 52, 54 are thus spaced so as to be engageable with the slide brackets 24. The hooks 52, 54 are on the top side of the housing 50 as depicted in FIG. 9.

Side flanges 56, 58 are formed on the planar support side 60 of the housing 50. The side flanges 56, 58 engage and hold the glides 80 depicted in FIGS. 11–14 and thus engage and hold swivel plate of the support arm. The side flanges 56, 58 include end tabs 62, 64 which serve to retain the swivel glides 80 described below, confined on the plate 60. The plate 60 further includes a forwardly projecting flange 66 with a first slot 68 and a second slot 70 for receiving fasteners 90 to attach the housing 50 to the slide brackets 24.

The swivel glides 80 depicted in FIGS. 11–14 are typically fabricated from a polymeric material. The glides 80 are configured to fit within the housing 50 to be retained by the flanges 56, 58. The swivel glides 80 therefore include an arcuate slot 82 for receipt of the keyboard arm swivel plate 84 depicted in FIG. 6. Thus, two glides 80 are provided, one associated with each of the flanges 56, 58 to cooperate with the circular swivel plate 84 and retain the plate 84 within the housing 50 constrained by the flanges 56, 58 as well as the retaining tabs 62, 64.

Figure 5:
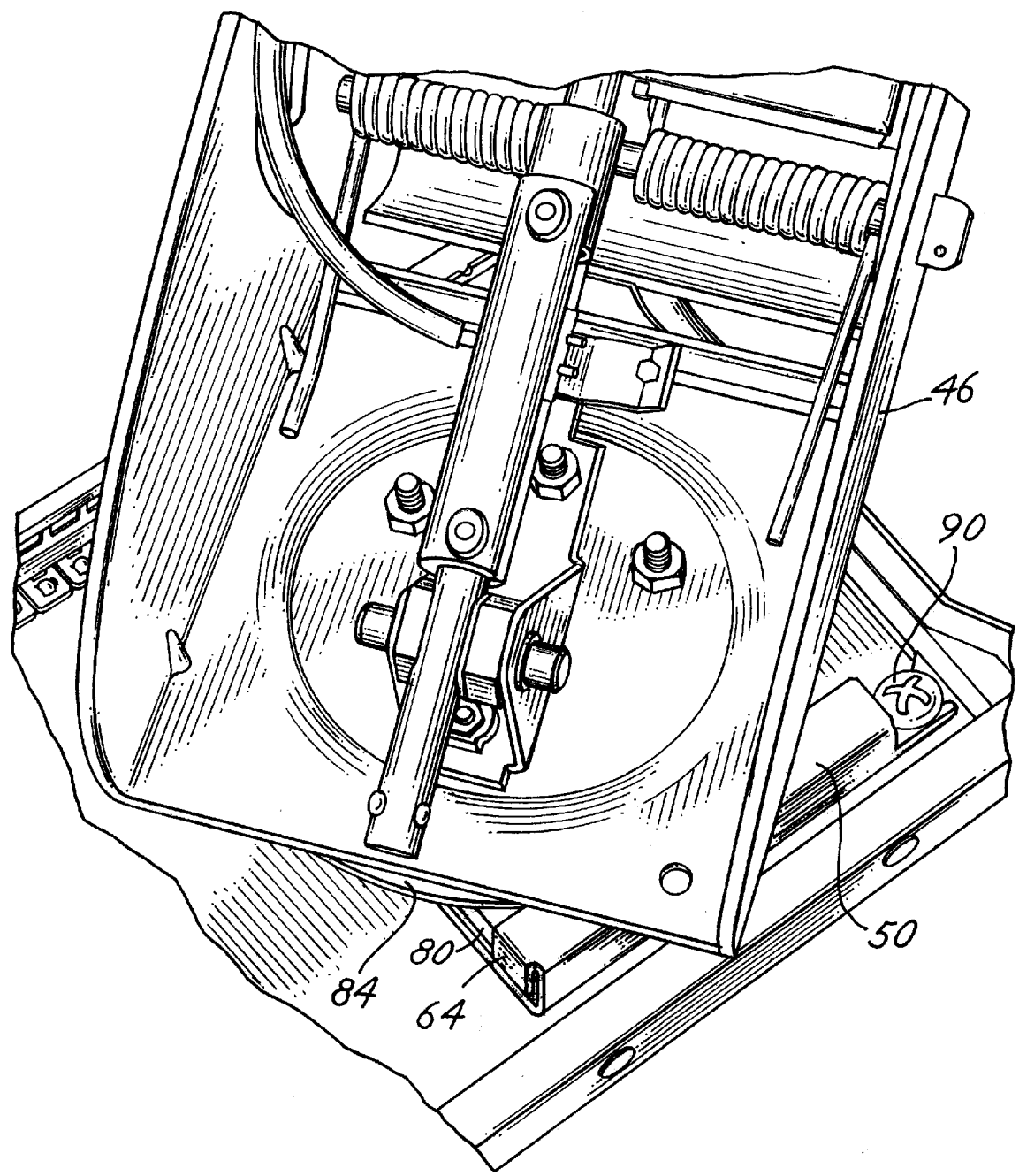
FIG. 5 is a view of the underside of the base frame of the assembly wherein the support arm has been fully attached to the slide mechanism of the base frame.
Figure 7:
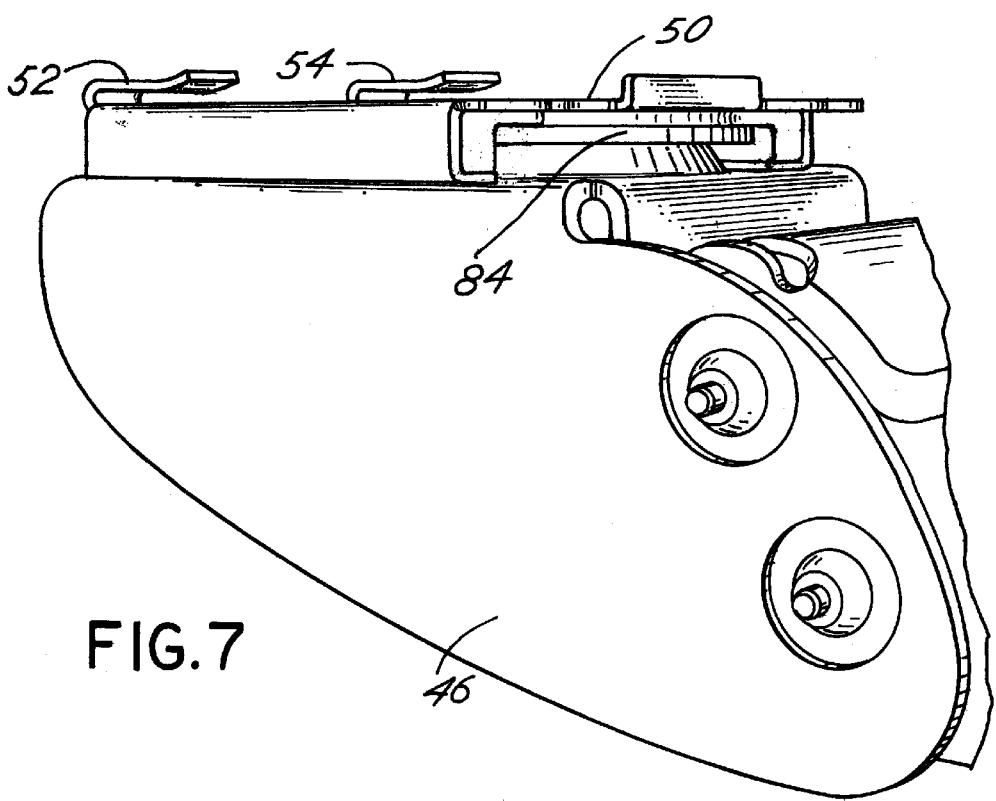
FIG. 7 is a side isometric view of the adapter and support arm of FIG. 6.
Figure 13:
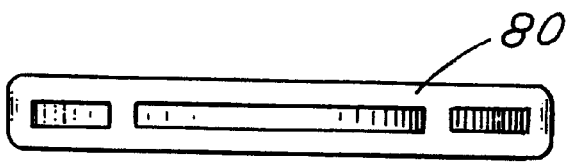
FIG. 13 is a back side elevation of the glide of FIG. 11.
Figure 11:
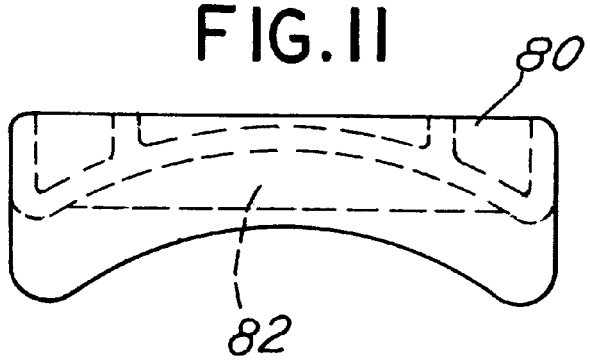
FIG. 11 is a plan elevation view of the swivel glide which is incorporated into the adapter of FIG. 8 and which engages the swivel plate of the keyboard support arm and retains that swivel plate engaged and positioned in the adapter of FIG. 8.
Figure 12:
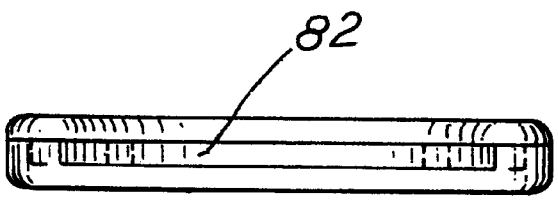
FIG. 12 is a front side view of the glide of FIG. 11.
Figure 14:
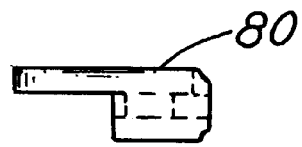
FIG. 14 is a side elevation of the glide of FIG. 11.

The component parts are assembled on the swivel plate 84. That is, the glides 80 are attached on the opposite sides of the plate 84 and then caused or effected to slide into the housing 50 retained by the flanges 56, 58. The assembly will then appear as depicted in FIG. 6, for example, or FIG. 7. The assembly is then in a condition to be attached to the base frame 20. Such attachment is effected as depicted in FIG. 4 and FIG. 5. Specifically, the housing 50 is positioned between the slide brackets 24 and the base frame 20. The housing and, more particularly, the extending hooks 52, 54 then slide over the slide bracket 24 on each side of the base frame 20. The slots 68, 70 then become aligned with mounting screws depicted in FIG. 4 as mounting screws 90. The mounting screws 90 are partially inserted into the slide brackets 24 when the adapter housing 50 is engaged with the slide brackets 24. After the slots 68, 70 are appropriately positioned with respect to the mounting screws or fasteners 90, the screws or fasteners 90 may be tightened to retain the adapter and thus the housing as well as the support arm 40 on the base frame. Note that the heads of the mounting screws 90 will then also be positioned in a manner which will preclude the swivel glides 80 from disengaging from the housing 50.

With the assembly described, the swivel plate 84 may easily rotate within the glides 80. The adapter being attached to the slide brackets 24 permits the support arm 40 to slide between the front and rear of the base frame. The assembly is much easier to construct or assemble inasmuch as the hooks 52, 54 facilitate attachment of the support arm with a minimum of effort. Additionally, since the mounting screws 90 are already positioned in the slide brackets 24 when the adapter including the housing 50 is engaged with the brackets 24, no effort is required when positioning mounting screws in openings. The screws 90 are already in the openings when the adapter and housing are engaged by sliding into engagement with the slide brackets 24.

FIG. 5 shows the adapter bracket including the housing fully mounted and attached to the slide bracket wherein the front mounting screws 90 retain the adapter including the housing 50. It is noted that variations of the construction are possible and considered to be within the scope of the claims. Such variations include providing a swivel plate that is only partially arcuate or circular and swivel glides compatible therewith. Other slot configurations in the swivel glides as well as in the plate are possible including construction wherein there is no swivel activity or action. Further, the hooks 52, 54 have been described as being incorporated with the housing 50. This is the preferred embodiment, though various component parts may be reversed. That is, it is possible to include a hook mechanism associated with the brackets 24, though that is not the preferred embodiment. Further, parallel slide brackets 24 have been disclosed. A single slide bracket extending between the sides of the base frame 20 may be utilized in combination with a single hook associated with the housing 50 and a single fastener associated with the housing 50. Thus, there are various alternatives and combinations which are considered to be within the scope of the claims. The invention is therefore to be limited only by the following claims and equivalents thereof.

What is claimed is:

1. In a keyboard support arm assembly including a base frame for attachment to the underside of a support surface, said base frame including a front, a back and opposite sides, said keyboard support arm assembly further including first and second parallel spaced slide tracks in the base frame extending between the front and back of the base frame, each track including a keyboard arm support and slide mechanism, said keyboard support arm assembly further including a keyboard plate for assembly with the base frame slide mechanism of said first and second slide tracks whereby a keyboard arm may be mounted on said keyboard plate and supported for sliding movement between the front and back of the base frame, the improvement comprising, in combination:

an adapter bracket for attaching the keyboard plate to the slide mechanisms, said bracket including a housing having at least one projecting support hook, at least one of said slide mechanisms including at least one hook receptor, said housing further including at least one attachment flange;

a fastener for attaching the housing attachment flange to at least one of said slide mechanisms, whereby the hook and fastener together support said housing on the said slide mechanisms, and a keyboard plate support and retention channel in the housing for receipt of the keyboard plate.

2. The support arm assembly of claim 1 wherein the housing has a front end and a back end and said hook comprises a first projecting support hook and a second projecting support hook at one end of the housing, and said housing attachment flange comprises a first slotted attachment flange at the other end of said housing and a second slotted attachment flange at the other end of said housing, said first and second slide mechanisms each including a hook receptor and a fastener opening whereby each slide mechanism is engageable by one hook and may be fastened to one slotted flange.

3. The support arm assembly of claim 1 wherein the housing includes opposed, spaced, keyboard plate engaging slots to receive and support the keyboard plate.

4. The support arm of claim 3 wherein the keyboard plate is at least partially circular and rotatably mounted in the plate engaging slots.

5. An adapter for attaching a keyboard arm having a connection plate for attachment to a base frame, said base frame having a front and a back, said base frame being attachable to the underside of a support surface and including first and second, spaced parallel slide members movable between the front and back of the base frame, said adapter comprising, in combination:

a housing, said housing having a front end, a back end and spaced sides between the ends, a projecting hook at one end of the housing and a projecting flange at the other end of the housing, said hook adapted to fit over one of said slide members to support the adapter and the flange configured for attachment to one of said slide members by a fastener, and said housing including connection plate receiving slots in the adapter for receiving the keyboard arm connection plate whereby the connection plate is retained in the adapter and the adapter is connectable to the said slide members by engaging said hook with one of said slide members and attaching said flange to one of said slide members with said fastener.

6. The adapter of claim 5 further including a separate glide member comprising the plate receiving slot of the adapter housing.

7. The adapter of claim 6 wherein the connection plate is at least partially round and the glide member includes an arcuate slot for rotatably receiving the connection plate.

8. The adapter of claim 6 wherein the housing is formed from metal and the glide member is a polymeric material.

9. The adapter of claim 5 wherein the hook is at the back end of the adapter housing and the flange is at the front end of the adapter housing.

* * * * *